United States Patent

Tanaka

[11] Patent Number: 5,522,666
[45] Date of Patent: Jun. 4, 1996

[54] BEARING DEVICE

[75] Inventor: Tsutomu Tanaka, Yokohama, Japan

[73] Assignee: Nifco Inc., Japan

[21] Appl. No.: 374,981

[22] Filed: Jan. 19, 1995

[30] Foreign Application Priority Data

Feb. 4, 1994 [JP] Japan .................................. 6-012777

[51] Int. Cl.$^6$ .................................................. F16C 27/02
[52] U.S. Cl. .............................................. 384/125; 384/215
[58] Field of Search ............................... 384/125, 215, 384/220, 222, 202, 217

[56] References Cited

U.S. PATENT DOCUMENTS

| 3,771,846 | 11/1973 | Bass et al. | 384/125 |
| 3,861,764 | 1/1975 | Adams | 384/125 |
| 4,639,147 | 1/1987 | Schwarz | 384/264 |
| 4,781,422 | 11/1988 | Kimble. | |
| 4,930,184 | 6/1990 | Kristmanson | 384/125 |

*Primary Examiner*—Lenard A. Footland
*Attorney, Agent, or Firm*—Parkhurst, Wendel & Burr

[57] ABSTRACT

A leaf spring is inserted into a holding groove defined in a holder of a bearing device from end-opened portions. Next, a shaft is inserted into the holding groove so that a small-diameter portion is supported by shaft holes. As a result, arcuate portions of the leaf spring are brought into surface contact with the outer peripheral surface of the small-diameter portion of the shaft and hold the small-diameter portion so that the small-diameter portion is enveloped from both sides. The arcuate portions are pressed by a plurality of ribs. Since the leaf spring is pressed by wall surfaces of the holding groove at all times, a frictional force between the leaf spring and the shaft is kept constant and a resisting torque is stabilized.

20 Claims, 6 Drawing Sheets

BEARING DEVICE

BACKGROUND OF THE INVENTION

1. Field of the Invention

The present invention relates to a bearing device for rotatably supporting a shaft used for connecting a cover to a main body.

2. Description of the Related Art

In an OA device such as a word processor 60, a display 46 is mounted to a keyboard 16 so as to be openable and closable. Thus, the display 46 can be compactly folded when not in use (see FIG. 4). A torque resistant to rotation is applied to a hinged portion provided between the keyboard 16 and the display 46 so that the speed at which the display 46 is opened or closed is kept constant so there is no shock to the display 46.

As a mechanism for developing such a resisting torque in the hinged portion, there has generally been known a structure shown in FIGS. 5 and 6.

Described specifically, a holder 62 is mounted to the keyboard 16 and a shaft 68 fixed to the display 46 is supported by a shaft hole 66 defined in a shaft plate 64 mounted to the holder 62. A leaf spring 74 is made tight or caulked so as to be mounted on a small-diameter portion 68A of the shaft 68 which is extending through the shaft hole 66 with the leaf spring 74 interposed between spacers 70 and 72. A torque resistant to the rotation of the shaft 68 is developed by a frictional force produced between an end face 68B of the shaft 68 and a side surface of the shaft plate 64 or between the side surface of the shaft plate 64 and the spacer 70 under the action of an urging force developed by elastic deformations of concave and convex portions of the leaf spring 74.

In such a torque producing mechanism, however, the caulked portion is loosened when the number of times in which the display is opened and closed increases, so that a stable resisting torque cannot be produced. Since the number of parts increases, the work of mounting the torque producing mechanism become cumbersome. It is also difficult to reduce the manufacturing cost.

SUMMARY OF THE INVENTION

With the foregoing in view, it is an object of the present invention to provide a bearing device capable of reducing the number of parts and producing a stable resisting torque.

According to one aspect of the present invention, for achieving the above object, there is provided a bearing device for rotatably supporting a shaft which is mounted to a main body and protrudes from a hinged portion of an opening and closing cover, comprising a holder mounted to the main body and having a holding groove defined therein so as to extend along the longitudinal direction of the holder, an urging plate press-fit between walls of the holding groove so as to press against the walls, and shaft holes defined in longitudinally-extending ends of the holder, for supporting a leading end portion and a base end portion of the shaft pressed against said urging plate.

The holder of the bearing device according to the present invention is mounted to the main body and rotatably supports the shaft which projects from the hinged portion of the opening and closing cover. The urging plate press-fit in the holding groove of the holder is pressed by the groove walls. The urging plate is pressed against the shaft having the leading end portion and the base end portion both supported by the shaft holes defined in the longitudinally-extending ends of the holder.

Thus, a frictional force is developed between the urging plate and the shaft and a constant resisting torque is exerted on the rotation of the shaft. Further, since the urging plate is pressed against the walls off the holding groove at all times, the frictional force is kept constant and the resisting torque is stabilized.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
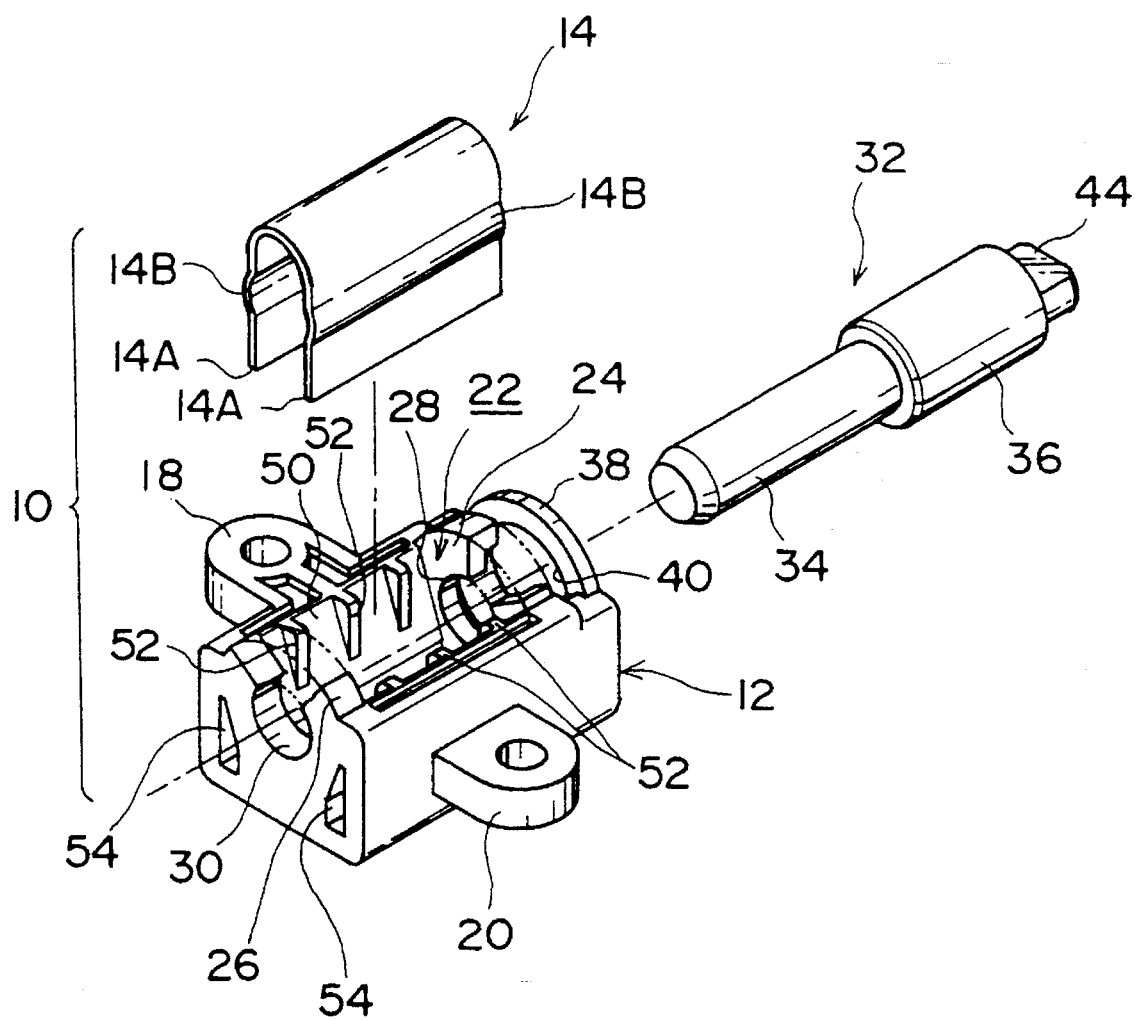
FIG. 1 is an exploded perspective view showing a bearing device according to one embodiment of the present invention and a shaft supported by the bearing device.
Figure 2:
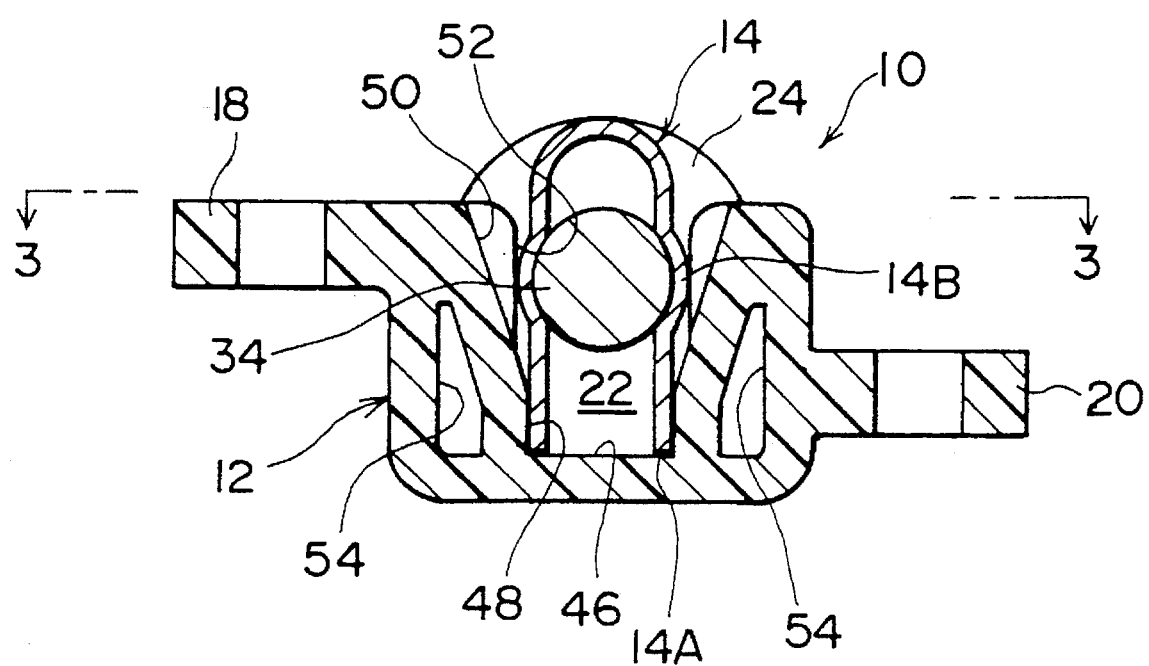
FIG. 2 is a cross-sectional view illustrating the manner in which the shaft supported by the bearing device shown in FIG. 1 is cut in the transverse direction thereof.
Figure 3:
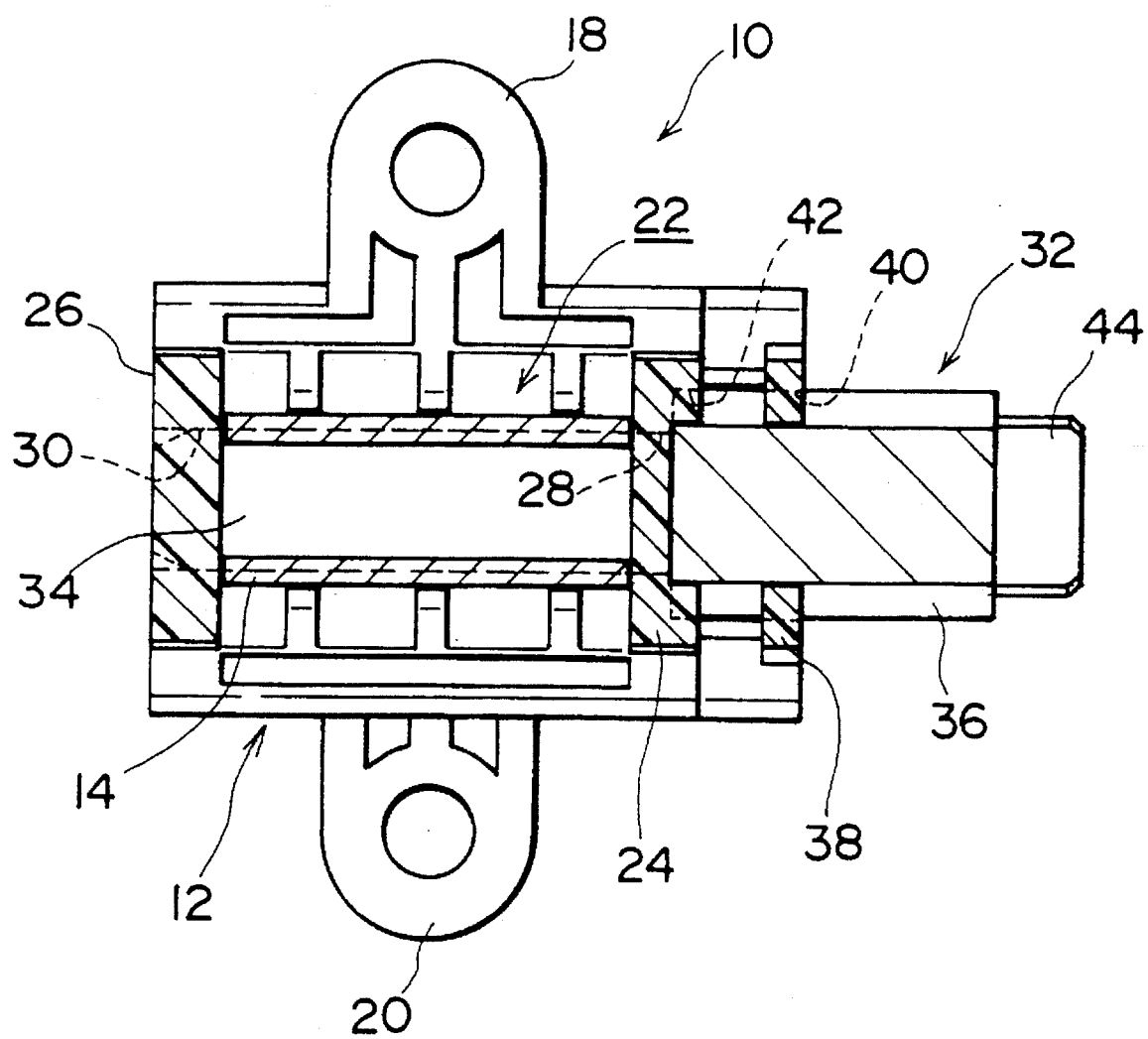
FIG. 3 is a cross-sectional view taken along line 3—3 of FIG. 2.

As shown in FIGS. 1 through 3, a bearing device 10 according to one embodiment of the present invention comprises a holder 12, a leaf spring 14 and a shaft 32. The number of parts has been reduced in the present bearing device 10.

Figure 4:
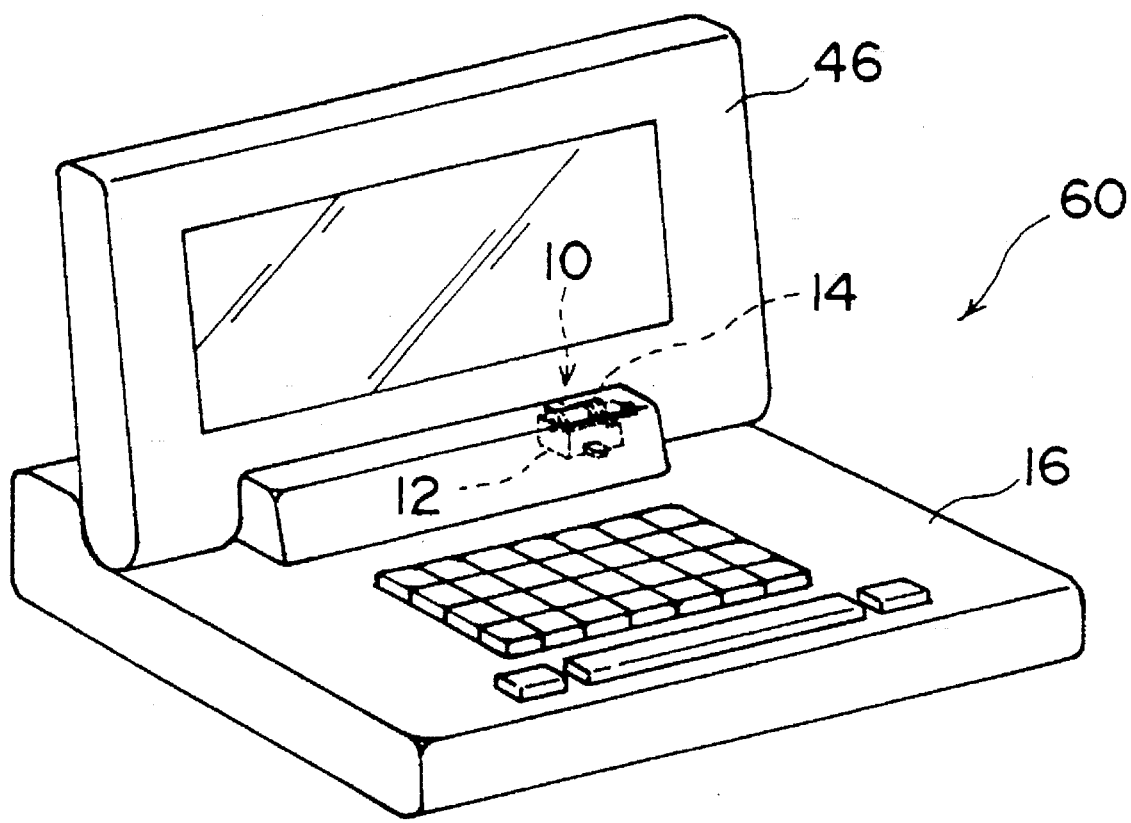
FIG. 4 is a perspective view showing the manner in which the bearing device shown in FIG. 1 is mounted to a keyboard and a display.
Figure 5:
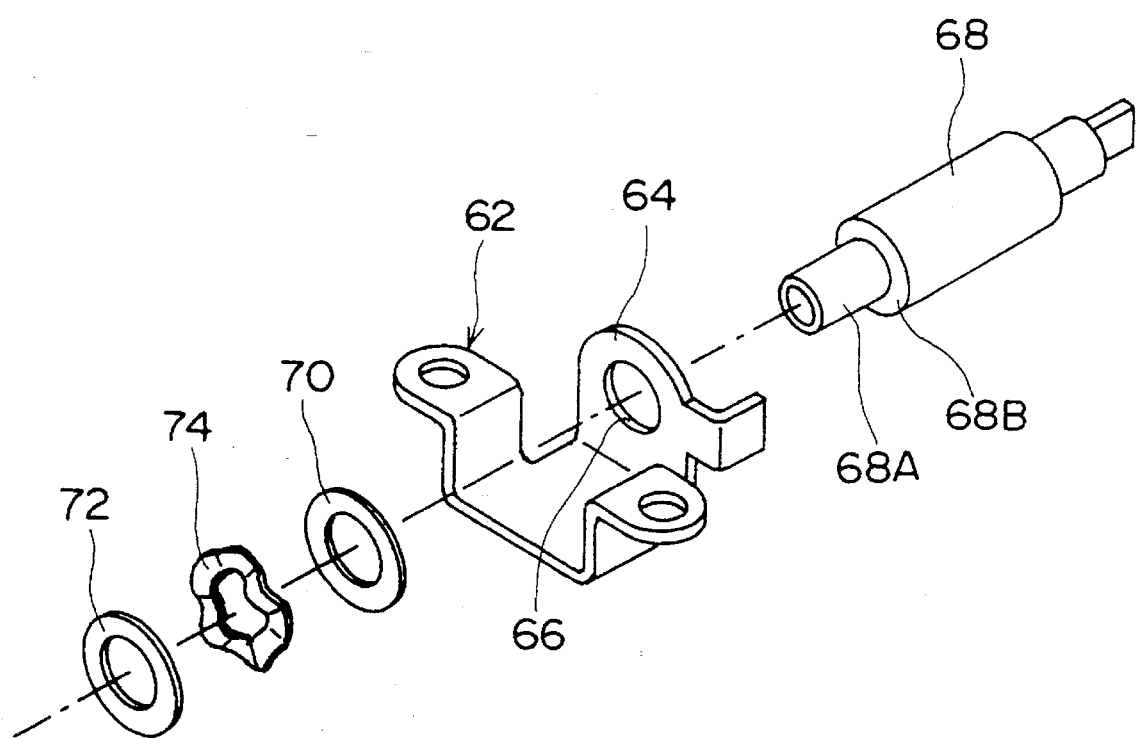
FIG. 5 is an exploded perspective view showing a conventional bearing device.
Figure 6:
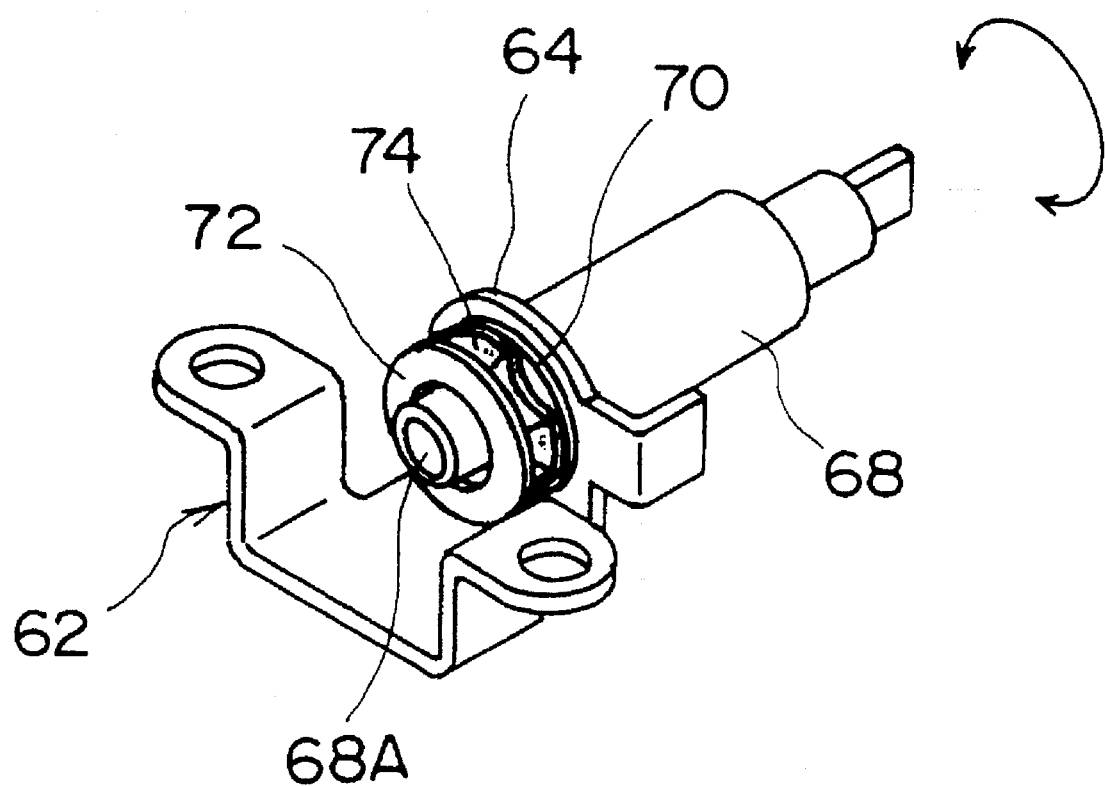
FIG. 6 is a perspective view depicting the manner in which a shaft is supported by the conventional bearing device.

The holder 12 is shaped in the form of a rectangular block and has brackets 18 and 20 provided at transversely-extending upper and lower ends thereof, for mounting the bearing device 10 to a keyboard 16 (see FIG. 4). A holding groove 22 whose upper portions are open is defined in the center of the holder 12. Shaft holes 28 and 30 extend through wall surfaces 24 and 26 of the holder 12, which are provided at longitudinally-extending ends of the holding groove 22. As shown in FIG. 3, a leading end portion of a small-diameter portion 34 of the shaft 32 is inserted into and supported by the shaft hole 30, whereas a base end of the small-diameter portion 34 is inserted into and supported by the shaft hole 28.

Further, a stop plate 38 opposed to the wall surface 24 with a predetermined space defined therebetween is mounted to the holder 12. A shaft hole 40 through which a large-diameter portion 36 of the shaft 32 is inserted, is defined in the stop plate 38. A counterbored portion 42 formed by enlarging a circumferential edge of the shaft hole 28 and identical in diameter to the shaft hole 40 is defined coaxially with the shaft hole 40. Thus, the large-diameter portion 36 of the shaft 32 is supported by the shaft hole 40 and the counterbored portion 42. A connecting plate 44 is mounted to an end surface of the large-diameter portion 36 of the shaft 32 so as to project in the axial direction of the shaft 32. Further, the connecting plate 44 is coupled to a hinged portion of the display 46 (see FIG. 4).

On the other hand, opposed groove walls 48 provided vertically from a bottom 46 and opposed tapered surfaces 50 each inclined in a direction in which the width of the holding groove 22 is enlarged from upper ends of the groove walls 48, are formed in the holding groove 22. A plurality of ribs 52 project from the tapered surfaces 50 in a direction of approaching each other anti partially decrease the width of the holding groove 22. Slits 54 are provided outside the groove walls 48 along the longitudinal direction off the holder 12 so that the width of the holding groove 22 can be elastically enlarged.

The leaf spring 14 having a U-shaped cross section is press-fit into the holding groove 22 through an opening thereof. End-opened portions 14A of the leaf spring 14 are interposed between the opposed groove walls 48 so that an interval defined between the end-opened portions 14A is slightly reduced. Further, opposed arcuate portions 14B, which are bent so as to expand to the outside, are formed in the longitudinally central portion of the leaf spring 14. The opposed arcuate portions 14B are brought into face contact with the outer peripheral surface of the small-diameter portion 34 of the shaft 32 so as to envelop the small-diameter portion 34 from both sides. Further, each of the outer surfaces of the opposed arcuate portions 14B is set to a size of being able to contact the ribs 52.

A procedure for mounting the keyboard 16 to the display 46 by the bearing device 10 according to the present embodiment will now be described.

First, the holder 12 is mounted to the keyboard 16 by the brackets 18 and 20. The leaf spring 14, which is lubricated with grease, is now press-fit into the holding groove 22 from the end-opened portions 14A side. Next, the shaft 32 is inserted through the shaft hole 40 so that the small-diameter portion 34 and the large-diameter portion 36 are respectively supported by the shaft holes 30 and 28 and the shaft hole 40 and the counterbored portion 42. As a result, the small-diameter portion 34 of the shaft 32 is interposed between the arcuate portions 14B of the leaf spring 14.

Since the bearing device 10 according to the present embodiment is formed using the two parts, the number of parts is reduced as compared with a conventional bearing device and the mounting of the keyboard 16 and the display 46 to each other by the bearing device 10 is facilitated.

When the leaf spring 14 is press-fit into the holding groove 22, the end-opened portions 14A are guided by the tapered surfaces 50. As a result, the end-opened portions 14A reach the opposed groove walls 48 while the interval defined between the end-opened portions 14A is being slightly narrowed, and are opened so as to press the groove walls 48 with an elastic force, thereby the end-opened portions 14A are securely engaged in the holding groove 12.

Further, the arcuate portions 14B of the leaf spring 14 are brought into face contact with the outer peripheral surface of the small-diameter portion 34 and hold the small-diameter portion 34 so that the small-diameter portion 34 is enveloped from both sides. The outer peripheral surfaces of the arcuate portions 14B are pressed by the ribs 52. Since both the end-opened portions 14A and the arcuate portions 14B of the leaf spring 14 are pressed by the groove walls 48 of the holding groove 22 and the ribs 52, a frictional force produced between the leaf spring 14 and the small-diameter portion 54 of the shaft 32 is not reduced. Further, since the arcuate portions 14B are brought into face contact with the small-diameter portion 54, a large frictional force can be produced. As a result, a stable large torque acts against the rotation of the shaft 32. The shaft 32 is pressed stronger by the leaf spring 14 with a force under which the width of the holding groove 22 is temporarily enlarged in width by the slits 54, tries to make a shape restoration. Incidentally, the leaf spring 14 may be press-fit in the holding groove 22 so as to hold the small-diameter portion 34 of the shaft 32 after the shaft 32 has firstly been inserted into the holding groove 22. The mounting procedure is not necessarily limited to the above procedure.

Having now fully described the invention, it will be apparent to those skilled in the art that many changes and modifications can be made without departing from the spirit or scope of the invention as set forth herein.

What is claimed is:

1. A bearing device for rotatably supporting a shaft having a leading end portion and a base end portion, said shaft being mounted to a main body and protruding from a hinged portion of an opening and closing cover, said bearing device comprising:

a holder mounted to the main body, said holder receiving the shaft and having internal walls defining a holding groove that extends along the longitudinal direction of said holder, said holder having first and second opposite ends having shaft holds formed therein; and an urging plate press-fit between the internal walls of said holding groove, wherein said holding groove receives the shaft such that said shaft holes of the first and second opposite ends respectively support the leading end portion and the base end portion of said shaft, and said urging plate presses against the shaft.

2. The bearing device as claimed in claim 1, wherein said holder further comprises brackets for mounting the bearing device to the main body.

3. The bearing device as claimed in claim 1, wherein said holding groove has an opened upper portion and a bottom narrower than the opened upper portion.

4. The bearing device as claimed in claim 1, wherein said holding groove widens in a vertical direction extending from a bottom of the holding groove.

5. The bearing device as claimed in claim 4, wherein a plurality of ribs protrude inwardly and toward each other from said internal walls.

6. The bearing device as claimed in claim 1, wherein portions of said urging plate, which are brought into contact with an outer peripheral surface of said shaft, are bent and formed as arcuate portions capable of face-to-face contact with the outer peripheral surface of said shaft.

7. The bearing device as claimed in claim 1, wherein slits are provided through the holder remote from the holding groove, and along the longitudinal direction.

8. The bearing device as claimed in claim 1, wherein said leaf spring is lubricated with grease.

9. The bearing device as claimed in claim 1, wherein the leading end portion of said shaft is formed as a small-diameter portion and the base end portion thereof is formed as a large-diameter portion.

10. The bearing device as claimed in claim 9, further comprising a connecting plate coupled to the hinged portion of the opening and closing cover is mounted to an end face of the large-diameter portion of said shaft.

11. The bearing device as claimed in claim 9, wherein said shaft holes extend through first and second opposite end walls provided at longitudinal opposite ends of said holding groove.

12. The bearing device as claimed in claim 11, wherein the shaft hold of the second opposite end includes a counterbored portion, said holder further comprising a stop plate having an enlarged through hole, the large-diameter portion of said shaft being supported between said counterbored portion and the through-hole defined in said stop plate.

13. The bearing device as claimed in claim 1, wherein said urging plate is a leaf spring having a U-shaped cross section and end-opened portions press-fit to and engaged in the internal walls.

14. A bearing device for rotatably supporting a shaft having a leading end portion and a base end portion, said shaft being mounted to a main body and projecting from a hinged portion of an opening and closing cover, comprising:

a holder mounted to said main body, said holder receiving the shaft and having internal walls defining a holding groove, said holding groove having an upper portion opened that is along the longitudinal direction of said holder and a bottom that is narrower than the opened upper portion;

a leaf spring having a U-shaped cross section and end-opened portions press-fit to and engaged in walls of said holding groove, said leaf spring having arcuate portions that are bent so as to be capable of face-to-face contact with an outer peripheral surface of said shaft; and a plurality of ribs protruding inwardly toward each other from the internal walls along said opened upper portion so as to press said arcuate portions, wherein said holdering groove receives the shaft such that said shaft holes of the first and second opposite ends respectively support the leading end portion and the base end portion of said shaft, and the shaft is pressed against said leaf spring.

15. The bearing device as claimed in claim 14, wherein the bottom of said holding groove is narrower than spacing between said end-opened portions of said left spring.

16. The bearing device as claimed in claim 14, wherein spacing between the internal walls forming said holding groove widens in a vertical direction extending from a bottom of the holding groove.

17. The bearing device as claimed in claim 14, wherein said urging plate is a leaf spring whose cross section is U-shaped and whose end-opened portions are press-fit to and engaged in the walls of said holding groove.

18. The bearing device as claimed in claim 14, wherein portions of said urging plate, which are brought into contact with the outer peripheral surface of said shaft, are bent and formed as arcuate portions capable of face-to-face contact with the outer peripheral surface of said shaft.

19. The bearing device as claimed in claim 14, wherein slits are provided through the holder remove from the holding groove, and along the longitudinal direction.

20. The bearing device as claimed in claim 14, wherein the leading end portion off said shaft is formed as a small-diameter portion and the base end portion thereof is formed as a large-diameter portion.

* * * * *